(No Model.)

E. F. PFLUEGER.
FISHING REEL.

No. 560,925. Patented May 26, 1896.

WITNESSES

INVENTOR
E. F. Pflueger
by E. W. Anderson
his Attorney

UNITED STATES PATENT OFFICE.

ERNEST F. PFLUEGER, OF AKRON, OHIO.

FISHING-REEL.

SPECIFICATION forming part of Letters Patent No. 560,925, dated May 26, 1896.

Application filed December 27, 1895. Serial No. 573,516. (No model.)

*To all whom it may concern:*

Be it known that I, ERNEST F. PFLUEGER, a citizen of the United States, and a resident of Akron, in the county of Summit and State of Ohio, have invented certain new and useful Improvements in Fishing-Reels; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
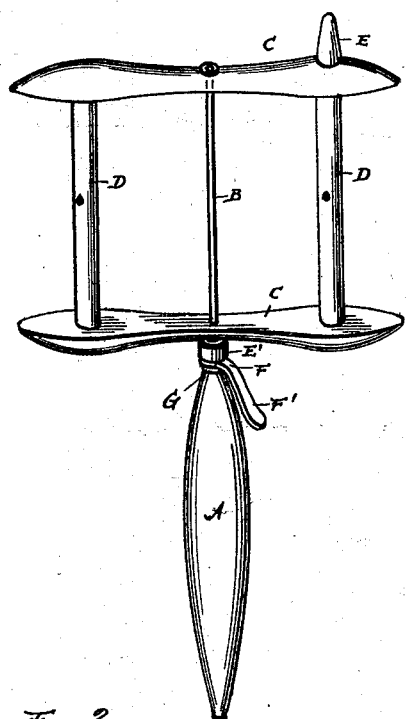
Figure 2:
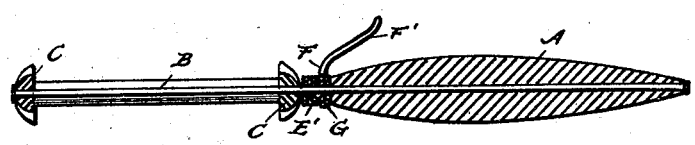

Figure 1 of the drawings is a representation of a perspective view of reel. Fig. 2 is a vertical section through center of same.

The object of this invention is to provide a simple, inexpensive, and convenient fishing-reel of improved character; and the invention consists in the novel construction and combination of parts, all as hereinafter described, and pointed out in the appended claim.

Referring to the accompanying drawings, the letter A designates the handle portion of the reel, in which is secured a spindle B.

C C designate the reel-heads, which consist of two parallel bars which are journaled centrally upon the spindle B to revolve thereon. Said heads are connected by the two posts D, one of which is extended through and beyond the upper head to form a handle E, by means of which the reel may be turned on the spindle.

Placed upon the spindle B, below the lower head C, is a cushion E, of rubber or other suitable material, whose upper end is arranged to bear upon the under side of the said head and whose lower end is seated upon a lever F. Said lever has a loose engagement with the spindle and is formed with a downwardly-bent handle portion F'.

G is a washer, which is placed between the lever and the upper end of the handle.

By depressing the handle of the lever the cushion E is forced against the lower head to check the movements of the reel or bring it to a stop at the will of the holder.

The line can be wound up with great rapidity by the use of this reel, which offers the same advantages as other and more expensive reels for "playing" the fish through the slight holding of the lever to let the reel drag.

A further advantage of this reel is that it allows the line to dry readily thereon.

Having thus described my invention, what I claim as new, and desire to secure by Letters Patent, is—

The herein-described fishing-reel, comprising a handle A, a spindle B secured therein, the reel proper mounted on said spindle and having a turning handle, the lever F loosely engaging the spindle below the reel and having a handle portion F' bent downwardly and adjacent to the upper portion of the handle, and the cushion-sleeve seated loosely upon said spindle between the lever and the reel, and adapted to be brought into frictional engagement with the lower head of said reel by the depression of the said lever, substantially as specified.

In testimony whereof I affix my signature in presence of two witnesses.

ERNEST F. PFLUEGER.

Witnesses:
 T. W. WAKEMAN,
 G. L. A. GALL.